UNITED STATES PATENT OFFICE 2,097,509

FIREPROOFING

Ernest R. Boller, Euclid, Ohio, assignor, by mesne assignments, to E. I. du Pont de Nemours & Company, Wilmington, Del., a corporation of Delaware No Drawing. Application February 1, 1935, Serial No. 4,523

5 Claims. (Cl. 21—20)

This invention relates to the fireproofing of vegetable materials, and is particularly directed to the fireproofing of such materials as wood, paper, cardboard, and the like, with fireproofing ammonium salts, particularly ammonium chloride, in the presence of urea.

The fireproofing of wood with aqueous solutions of ammonium salts has proven none too satisfactory. Most ammonium salts, when allowed to crystallize by slow evaporation of their solutions under atmospheric conditions, exhibit the phenomenon usually designated as "creeping". When wood, or the like, is impregnated with a solution of ammonium salt, its surface, upon drying, becomes covered with a thick coating or crust of the salt.

Obviously, this creeping of ammonium salts renders their use rather unsatisfactory. Wood covered with a crust of salt is unpleasant to handle, and it presents an unsightly appearance. It is, moreover, difficult to work and finish. In addition, a very appreciable amount of the fireproofing salt is lost by its creeping from the interior of the wood, with a consequent reduction in the fire resistance of the treated timber.

Though the commonly used fireproofing agents, ammonium phosphate and ammonium sulfate, display a considerable creeping action, ammonium chloride offers by far the greatest difficulties from this cause. Thus, wood treated with a combination of a metallic chloride preservative salt, such as zinc chloride, and an ammonium salt, such as the phosphate or sulfate, shows particularly bad creeping by reason of the ammonium chloride formed by metathesis of the ammonium salt and the chloride.

I have found that the creeping of ammonium salts, particularly ammonium chloride, can be practically eliminated by the addition of urea. If the impregnation of a vegetable material with an ammonium salt be conducted in the presence of urea, the creeping of the salt is substantially prevented. The effect of urea is most noticeable when the fireproofing composition contains ammonium chloride, either added directly or formed by reaction of its constituents. It seems probable that the pronounced effect of urea is attributable to some change in the crystal habits of ammonium salts in the presence of urea. It will be understood, of course, that my invention is not limited by this hypothesis.

Wood, and the like, treated with solutions containing an ammonium salt and urea is decidedly better than wood treated with similar solutions which contain no urea. Wood treated according to my invention presents a pleasing appearance, and it can easily be worked and handled without the disadvantages attendant upon the use of wood treated with ammonium salts in the usual manner. Moreover, substantially all of the salt absorbed by the wood remains as effective fireproofing agent. Urea has no harmful effect on vegetable fibers, and it does not require changes in the present processes of impregnation. By the addition of urea to fireproofing salts, with a consequent elimination of creeping, it will be possible to use fireproofed wood in many places where it has previously been unsatisfactory.

In order that my invention may be more fully understood, the following examples are given:

*Example 1.*—Pieces of yellow pine were treated with a combination preserving and fireproofing composition. In one series of tests, urea was used according to my invention, while in a comparative series of tests the same composition was used except that urea was omitted. The treating solution of the preserving and fireproofing composition contained the following:

|  | Per cent |
|---|---|
| Zinc chloride | 2.5 |
| Sodium dichromate | 0.5 |
| Sodium silicofluoride | 0.5 |
| Mono-ammonium phosphate | 9.6 |
| Water | Balance |

Wood treated with this solution was examined for fire resistance by the standard fire tube test which has been developed by the U. S. Forest Products Laboratory. In another series of tests, performed under identical conditions, one and nine-tenths per cent of urea was added to the above listed composition. The results are set forth below so that they may easily be compared:

| With 1.9% urea | | | Without urea | | |
|---|---|---|---|---|---|
| Retention, lbs. salt per cu. ft. | Max. temp. °C. | Per cent wood consumed | Retention, lbs. salt per cu. ft. | Max. temp. °C. | Per cent wood consumed |
| 5.60 | 230 | 18 | 4.06 | 730 | 54 |
| 3.30 | 300 | 24 | 2.30 | 720 | 57 |
| 3.10 | 300 | 24 | 2.95 | 710 | 59 |

As seen in the table the inclusion of urea had a very beneficial effect on the fire resistance of the wood. The action of the urea on creeping of the ammonium salts were quite evident even on a casual inspection of the treated wood. The wood treated in the absence of urea was covered with a crust of salt, while the wood treated in the presence of urea was quite clean. This elimination of creeping, with consequent greater concentration of fireproofing salt in the interior of the wood, accounts for higher fire resistance of specimens treated with urea.

*Example 2.*—Blocks of yellow pine sapwood were impregnated with a preserving and fireproofing solution such as the one of Example 1, except that two and four-tenths per cent of urea was added. The wood was treated for one hour at a pressure of one-hundred and fifty pounds per square inch and at a temperature of 90° F. Very good results were obtained, none of the specimens showing any evidence of creeping.

The amount of urea used may be widely varied, but the desirable properties of urea are best utilized with no less than about ten to forty per cent based on the weight of ammonium salt. Larger amounts may, of course, be used, but they add to the cost of the composition without adding substantially to its desirable properties. More specifically, I prefer to use between about twenty and twenty-five per cent of urea based on the weight of ammonium salt. In Example 1, the urea was used in an amount corresponding to about twenty per cent of the amount of monoammonium phosphate.

It will be readily apparent that the essential feature of my invention is the combination of urea with ammonium salts, particularly ammonium chloride, for the fireproofing of fibrous vegetable material, and other preserving, fireproofing, and treating materials may be included in the composition without departing from the spirit of my invention. The specific processes employed in applying my compositions may be widely varied, the essential feature of the processes of this invention being the treatment of vegetable materials with ammonium salts, particularly ammonium chloride, in the presence of urea.

While I have mentioned certain specific compositions and proportions above, I do not intend to be limited thereby, the scope of my invention appearing from the following claims:

I claim:

1. In a process of fireproofing vegetable materials, the step comprising subjecting the material to the action of a solution of an ammonium salt and urea.

2. In a process of fireproofing vegetable materials, the step comprising subjecting the material to the action of a solution of ammonium chloride and urea.

3. In a process of fireproofing vegetable materials, the step comprising subjecting the material to the action of a solution of ammonium chloride and about ten to forty per cent of urea based on the weight of the ammonium salt.

4. In a process of fireproofing vegetable materials, the step comprising subjecting the material to the action of a solution of ammonium chloride and about twenty to twenty-five per cent of urea based on the weight of the ammonium salt.

5. In a process of fireproofing wood, the step comprising subjecting the wood to the action of a solution containing ammonium chloride and a smaller amount of urea, the ammonium chloride resulting from the reaction of a metallic chloride and an ammonium salt originally added to the solution.

ERNEST R. BOLLER.